April 25, 1967

M. ROSSNAN

Re. 26,198

FISHING DEVICES

Original Filed April 15, 1965

Michael Rossman
INVENTOR

United States Patent Office

Re. 26,198

Reissued Apr. 25, 1967

26,198

FISHING DEVICES

Michael Rossnan, 11724 Lovejoy St., Silver Spring, Md. 20902

Original No. 3,205,607, dated Sept. 14, 1965, Ser. No. 448,331, Apr. 15, 1965. Application for reissue Sept. 7, 1966, Ser. No. 582,195

4 Claims. (Cl. 43—36)

Matter enclosed in heavy brackets [ ] appears in the original patent but forms no part of this reissue specification; matter printed in italics indicates the additions made by reissue.

My present invention relates to improvements in fishing devices, and more particularly to a plural fishing hook that may be used with eatable bait or lures, one object of the same being the provision of novel means of mounting these hooks, one of which is fixedly mounted in a metal support while the other hooks are oscillatably mounted, spring-spread, and are normally held in parallel, one upon each side of the fixed hook, by a bait or other fish attracting means which when "struck" or removed by the biting fish releases the spring-acted hooks to permit them to move in opposite directions from the fixed hook and thus presents a plural number of barbed hooking means to insure the "catch" over the normal single hook now in use.

Another object of the present invention is the provision of a fishing device attached to a line, for either deep-sea or other fishing, in which the bait or a trigger holds a plurality of hooks with their barbed ends in parallel and in which, where three hooks are employed, two are spring released; or where two hooks are employed, one is spring released to produce a "spread" of hooks that, when in the fish's mouth or gullet, will insure the catch by either one or all hooks being driven home and secure the fish to the line.

In order that the present invention may be fully understood and its advantages be appreciated, attention is invited to the accompanying drawings, in which.

Figure 1:
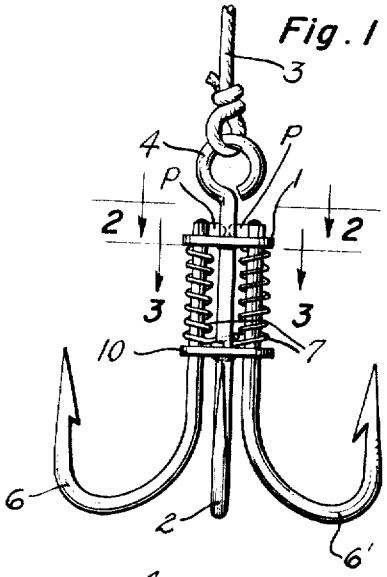
FIGURE 1 is a side view of the complete device.
Figure 2:
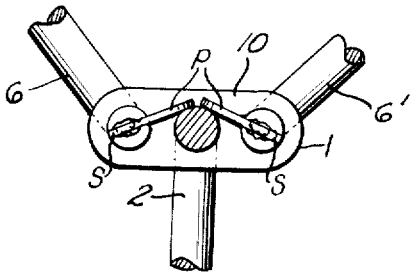
FIGURE 2 is a section line 2—2 of FIGURE 1.
Figure 3:
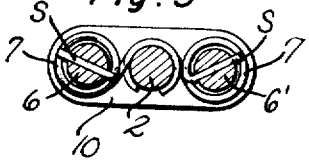
FIGURE 3 is a section on line 3—3 of FIGURE 1.
Figure 4:
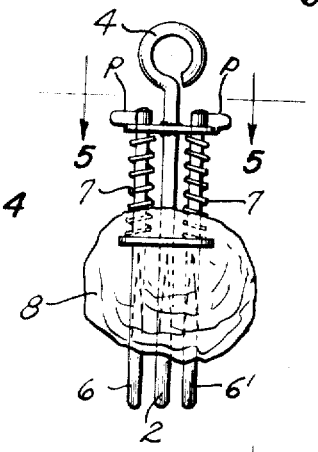
FIGURE 4 is a view showing the hooks in baited position with an eatable bait attached.
Figure 5:
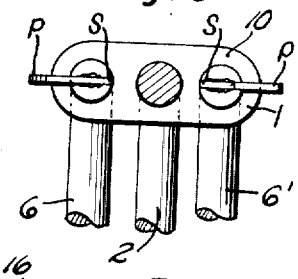
FIGURE 5 is a section on line 5—5 of FIGURE 4.

Referring to the drawings, and more particularly to FIGURES 1 through 5, the numeral 1 designates a metal plate to which a fixed hook 2 has its shank portion anchored to, so that a line 3 can be attached to the loop or eye 4. Rotatably or oscillatably mounted in the plate, at opposite sides of the shank portion of the fixed hook, are here shown the shank portions of the two hooks 6 and 6', while surrounding the shank portion of each hook 6 or 6' is a coiled spring 7 having its ends connected to the shank portion of the fixed hook and the shank portion of each oscillatable hook respectively. When the bite portions and barb portions of hooks 6–6' are in parallel with the bite portion and barb portion of the fixed hook, the springs are tensioned to move the bite and barb portions of the oscillatable hooks outwardly from the bite and barb portions of the fixed hook. When the bait 8, as shown in FIG. 4, is removed by a biting fish the tension of the springs move the bite and barb portions of the oscillatable hooks outwardly from the bite and barb portions of the fixed hook, thus presenting a plural number of hooks in different positions to pierce a portion of the mouth or gullet and thus insure the catching or more fish than is the case where but one hook is used.

The extreme upward end of the shank portion of each hook 6–6' is provided with a slot S into which is welded a wedge plate P, and which receives the upper end of the coiled spring on each shank. The plate 1 cooperates with plate P, the upper spring end and the slots to prevent any longitudinal movement of the oscillatable hook while allowing oscillatory movement.

It will be noted that the upper end of the spring 7 is located in the lower end of the slot S and under the upper plate, while in the upper end of the slot is the plate P which is welded in the slot S. The spring then forms a stop against upward longitudinal movement of the oscillatory hook, while the plate P acts to hold the oscillatory hook against movement in the opposite direction, yet permitting the shank of the oscillatory hook to have its desired movement.

The plate P is of such length and at a predetermined angle, due to the slot S, that when the respective oscillatory hook is at its extreme position away from the main hook, the end of the plate P strikes or contacts the upper end of the shank portion of the main hook and thus limits the position of the bite and barb portions of each oscillatory hook relative to the bite and barb portions of the main hook.

The plate 10 is anchored to the shank portion of the fixed hook, while the shank portions of the spring-actuated hooks can oscillate therein.

Where but two hooks are employed a fixed and one spring-actuated hook is employed.

Figure 6:
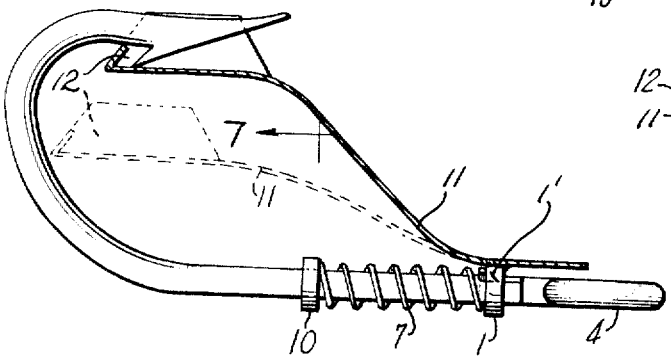
FIGURE 6 is a side view of a modification of this device employing a trigger in place of the bait.
Figure 7:
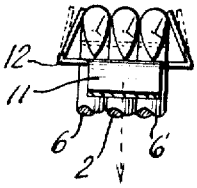
FIGURE 7 is a section at the arrowpoint 7 of FIGURE 6.

As shown in FIGURES 6 and 7, a trigger 11, attached to the plate 1' or the shank portion of the fixed hook, has its free end 12 positioned to engage and hold all three barbed ends of the fixed and spring-actuated hooks in parallel.

Figure 8:
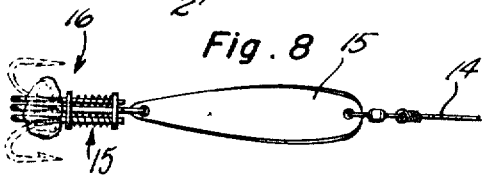
FIGURE 8 is a view of the present fishing device in position when used with a lure, here shown as a spoon type.

As shown in FIGURE 8, a line 14 is attached to a lure 15, here shown as a spoon, while attached to the other end of the lure is a complete fishing device 15, similar thereabove described.

From the foregoing description, taken in connection with the drawings, it will be seen that here is designed a simple, yet practical, fishing device, which, when the bait is attached, presents itself substantially as one hook, but which, when the bait is removed by the swallowing of the bait and hook by the fish, will release two spring controlled hooks if three hooks are used, or will release one spring controlled hook if two hooks are used, to present a plural hooking device instead of a single hook has is the present practice, and by so doing this the possibility of landing the fish is greatly increased and a surer catch is obtained.

What I claim as new is:

1. A fishing device including a main hook having a shank portion, a bite portion, a barb portion, and a line attaching means, at least one oscillatory hook having a shank portion, a bite portion, and a barb portion with a slot formed in the end of the shank portion remote from the bite portion and the barb portion, two plates anchored in spaced relation to each other to the shank portion of the main hook and provided with journals for the shank portion ofthe oscillatory hook, a coiled spring mounted upon the shank portion of the oscillatory hook between the two plates, the terminal at one end of the spring being anchored to the main hook, and the other terminal is located in the lower end of the slot and against the underside of the upper plate, and a wedge plate welded in the upper end of the slot of the oscillatory hook and acting with the aid of the terminal of the spring in the slot to hold the shank of the oscillatory hook against longitudinal movement and also to permit free oscillatory movement to the hook, whereby the wedge plate and the spring combined with the upper plate act to hold the spring end securely in the slot, said wedge plate having an extension engageable with the shank of the main hook to act as means to limit the movement of the oscillatory hook.

2. A fishing device as claimed in claim 1, wherein a trigger device is movably connected to the shank portion of the fixed hook so that the free end of the trigger can engage the barb portions of the hooks when the bite portions and the barb portions of the hooks are in parallel.

3. A fishing device as claimed in claim 1 wherein said plates are substantially oblong with the longitudinal axis coinciding with the plane of the said shanks.

*4. A fishing device comprising a main fishhook including an integral shank portion, a bight portion and a line receiving eye mounted directly on said shank portion, a first supporting plate rigidly mounted on said shank portion below said eye, a second supporting plate rigidly mounted on said shank portion in spaced relation to said first supporting plate, at least one additional fishhook including shank and bight portions, said additional fishhook being rotatably mounted on said first and second*

*supporting plates for rotation about an axis parallel to the axis of the shank of said main fishhook, a coil spring surrounding the shank of said additional fishhook, the terminals of said coil spring being so connected as to exert tension on said additional fishhook to rotate and hold the bight thereof at a substantial angle to the bight of said main fishhook, said bight portion of said additional fishhook being rotatable against the bias of said spring to a position parallel to said bight portion of said main fishhook, and means for holding said additional fishhook against longitudinal movement on said first and second supporting plates.*

References Cited by the Examiner

The following references, cited by the Examiner, are of record in the patented file of this patent or the original patent.

UNITED STATES PATENTS

| | | | |
|---|---|---|---|
| 463,240 | 11/1891 | Zuckweiler | 43—35 |
| 470,279 | 3/1892 | Zuckweiler | 43—35 |
| 657,387 | 9/1900 | Bew | 43—35 |
| 800,001 | 9/1905 | Miller | 43—36 |

SAMUEL KOREN, *Primary Examiner.*

WARNER H. CAMP, *Examiner.*